(12) United States Patent  
Glorfield

(10) Patent No.: US 6,290,055 B1  
(45) Date of Patent: Sep. 18, 2001

(54) DEVICE FOR ORIENTING AND ACHIEVING THE OPTIMAL DENSITY OF A QUANTITY OF ELONGATED OBJECTS

(76) Inventor: Paul Glorfield, 293 N. 350 East, Rupert, ID (US) 83350

( * ) Notice: Subject to any disclaimer, the term of this patent is extended or adjusted under 35 U.S.C. 154(b) by 0 days.

(21) Appl. No.: 08/926,225

(22) Filed: Sep. 9, 1997

(51) Int. Cl.[7] .................................................. B65G 47/19
(52) U.S. Cl. ................. 198/532; 198/550.01; 414/789.1
(58) Field of Search ................. 198/597, 418.6, 198/560, 562, 550.01, 550.4, 383, 384, 393, 397.01, 397.06, 532; 414/789.1; 53/529, 236, 439

(56) References Cited

U.S. PATENT DOCUMENTS

| | | | |
|---|---|---|---|
| 808,067 | * 12/1905 | Briggs | 198/550.01 X |
| 3,498,022 | * 3/1970 | Godet | 414/789.1 |
| 3,774,782 | * 11/1973 | Lewis, Jr. | 414/789.1 |
| 3,902,586 | * 9/1975 | Hill | 414/789.1 X |
| 4,087,001 | * 5/1978 | Daisley | 198/597 X |
| 4,579,498 | * 4/1986 | Lukkari et al. | 414/789.1 |
| 4,732,066 | * 3/1988 | Del Fabro et al. | 414/789.1 X |
| 4,871,059 | * 10/1989 | Rantanen et al. | 198/532 |

* cited by examiner

Primary Examiner—James R. Bidwell  
(74) Attorney, Agent, or Firm—Thompson E. Fehr

(57) ABSTRACT

A device for orienting and achieving the optimal density of a quantity of elongated objects having a cleated conveyor belt with a substantially horizontal first portion upon which a pre-weighed product is deposited, an inclined middle portion, and a substantially horizontal end portion. The inclined conveyor belt establishes an even rate of discharge for the elongated objects so that such elongated objects tend to be oriented in a horizontal plane after they have fallen into a product orientation hopper. By having the width of the product-orientation hopper narrower than the length of most of the elongated objects, the longitudinal axis of the elongated objects will tend to be parallel to the sides of the product-orientation hopper. The product-orientation hopper is, also, vibrated to increase the density of the elongated objects. To fill voids which exist between the elongated objects in the product-orientation hopper, a horizontal squeezer pushes such elongated objects from their ends by forcing the ends of the product-orientation hopper toward one another.

27 Claims, 4 Drawing Sheets

DEVICE FOR ORIENTING AND ACHIEVING THE OPTIMAL DENSITY OF A QUANTITY OF ELONGATED OBJECTS

BACKGROUND OF THE INVENTION

1. Field of the Invention

This invention relates to a device and method for packaging; especially, it relates to a device and method for orienting and achieving the optimal density of a quantity of elongated objects such as french-fried potato strips.

2. Description of the Related Art

Several patents have dealt with orienting and achieving the optimal density of a quantity of elongated objects such as french-fried potato strips.

U.S. Pat. No. 4,843,795 of David Shroyer has the strips deposited on an essentially horizontal conveyor belt. This conveyor belt then transports the elongated objects to a vibrating alignment container that has a curved rear wall and an angled front wall for substantially aligning the elongated objects.

To the previous patent, U.S. Pat. No. 4,955,178 of David Shroyer basically adds a vibrating tube below the vibrating alignment container as a second portion of the alignment container. In the original portion of the alignment container, the elongated objects are vibrated while passing through the alignment container. In the tube, however, the elongated strips are retained while they are being vibrated.

Finally, U.S. Pat. No. 4,965,984 of Richard Farnsworth, Donald Deines, and Alvin Deines has the elongated objects deposited upon a cleated, inclined conveyor belt. On lines 12 through 14 of column 3, the patent asserts, "It is important to note that the conveyor belt should be configured at an acute angle . . . with respect to the vertical in order for the articles to be aligned on the conveyor flights." (The cleats are termed "flights.") In fact, however, the V-shaped space then created between the conveyor belt and the hopper which delivers the objects to the conveyor belt tends to result in breakage of fragile products such as french-fried potato strips. Moreover, elongated objects, having downward momentum as a result of the drop from the hopper to the conveyor belt, tend repeatedly to tumble end over end at the bottom of such an inclined conveyor because the elongated objects are much longer than the height of the flights; similarly, the upward momentum imparted by the inclined conveyor belt to the elongated objects often causes such objects to tumble end over end near the highest point of the inclined conveyor belt, i.e., where the elongated objects are discharged from the inclined conveyor belt.

SUMMARY OF THE INVENTION

The present invention uses a metering hopper to deposit a pre-weighed product charge upon a cleated conveyor belt. The first portion of the cleated conveyor belt, i.e., that portion on the cleated conveyor belt upon which the pre-weighed product is deposited, is substantially horizontal. The conveyor belt is then vertically inclined throughout its middle portion. And the end portion of the conveyor belt is substantially horizontal.

Having the first portion of the cleated conveyor substantially horizontal precludes the creation of a V-shaped area between the hopper and the conveyor belt where fragile products could be broken. Also, the momentum which tends to cause elongated objects repeatedly to tumble end over end when such elongated objects are deposited upon an inclined conveyor belt is dissipated on the horizontal first portion of the present cleated conveyor belt before the conveyor belt begins its inclined middle portion; therefore, the elongated objects do not tend to tumble end over end as they begin the ascent up the incline. Similarly, the upward momentum generated by the incline is gradually dissipated as the conveyor belt approaches a substantially horizontal orientation near the end portion of the conveyor belt.

As the elongated objects proceeds up the incline, some objects will slough off and fall back down the cleated belt, leaving a small, regulated portion to exist within the space between successive flights. Each flight is preferably at least one inch in height, and the space between successive flights is preferably six inches.

At the tip of the end portion of the conveyor belt, the elongated objects fall from the conveyor belt into a vibrating product-orientation hopper. A further advantage of the substantially horizontal orientation of the end of the conveyor belt is that it minimizes the distance between the point of discharge of the elongated objects from the conveyor belt and the product-orientation hopper. This, of course, decreases the time gravitational acceleration can act upon the objects and, therefore, the speed which such objects attain. Moving slower, there is less chance for fragile object to be damaged.

Using the inclined belt to establish an even rate of discharge for the elongated objects tends to allow such elongated objects to bounce in the product-orientation hopper and to settle into a position of lowest energy, as dictated by the laws of entropy, before additional elongated objects fall and preclude the elongated object which dropped earlier from achieving its lowest potential energy. This tends to cause each elongated object to be oriented in a horizontal plane. Furthermore, by having the thickness of the product-orientation hopper narrower than the length of most of the elongated objects, the longitudinal axis of the elongated objects will tend, also, to be parallel to the sides of the product-orientation hopper.

Furthermore, the product-orientation hopper is vibrated; and this vibration tends to cause smaller elongated object to tend to move toward the bottom of the product-orientation hopper, which, in turn, creates a greater density of elongated objects in the vertical direction. Unfortunately, this also tends to cause the elongated objects to spread more and be less dense parallel to the sides of the product-orientation hopper in the horizontal direction. Therefore, horizontal squeezers are activated at each end of the product-orientation hopper to push the elongated objects away from the ends of the product-orientation hopper and, consequently, to optimize the density of the elongated object horizontally within the product-orientation hopper.

DESCRIPTION OF THE PREFERRED EMBODIMENT

Figure 1:
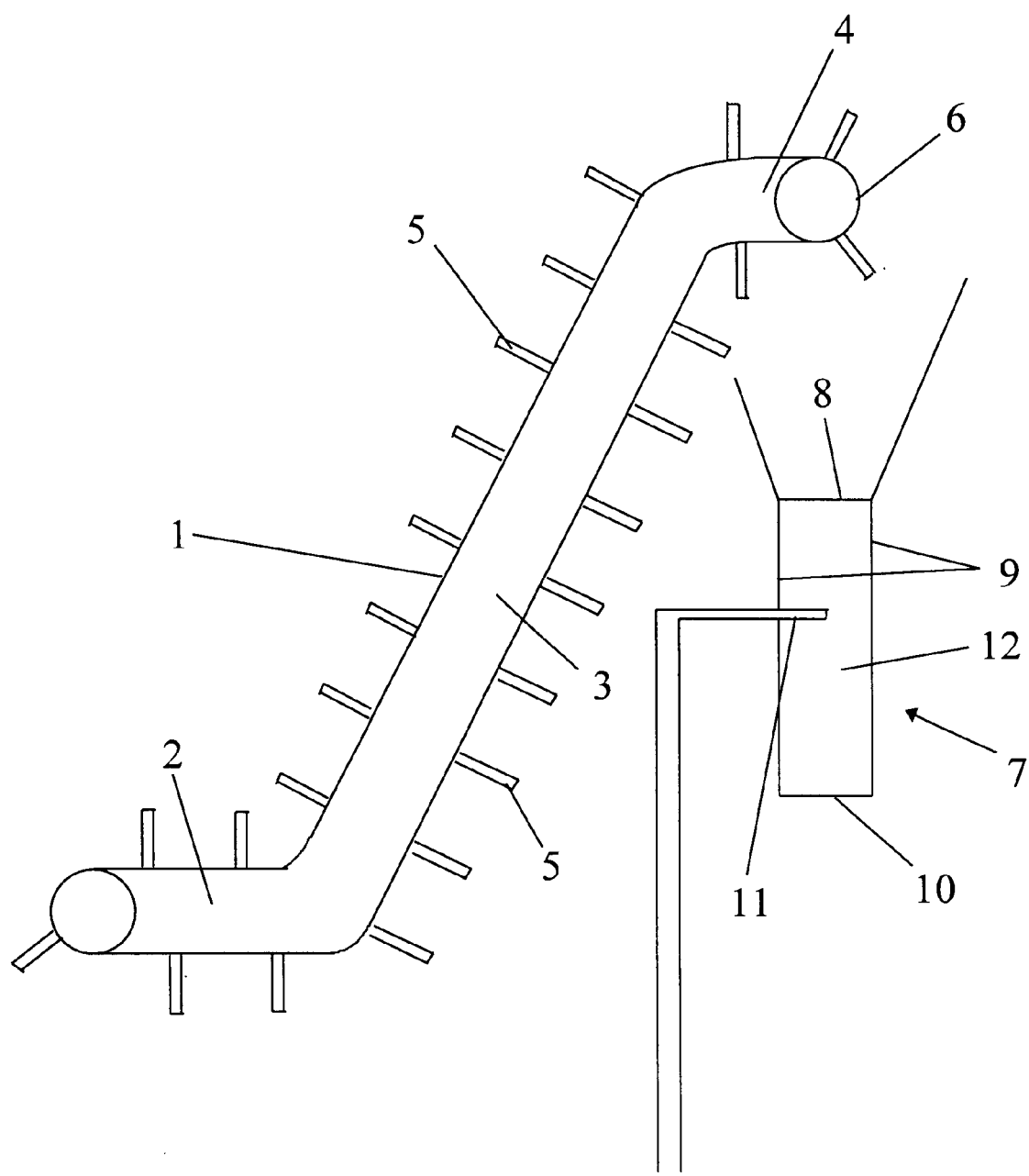
FIG. 1 is an elevation view of the Device for Orienting and Achieving the Optimal Density of a Quantity of Elongated Objects.

As illustrated in FIG. 1, the Device for Orienting and Achieving the Optimal Density of a Quantity of Elongated Objects has a cleated conveyor belt 1, as part of any type of conveyor that is well known in the aft, for receiving a pre-weighed product charge from a metering hopper.

The first portion 2 of the cleated conveyor belt 1, i.e., that portion 2 on the cleated conveyor belt 1 upon which the pre-weighed product is deposited, is substantially horizontal. The conveyor belt 1 is then vertically inclined throughout its middle portion 3. And the end portion 4 of the cleated conveyor belt 1 is substantially horizontal.

As the elongated objects proceeds up the incline, some objects will slough off and fall back down the cleated conveyor belt 1, leaving a small, regulated portion to exist within the space between successive flights 5. Each flight 5 is preferably at least one inch in height, and the space between successive flights 5 is preferably six inches.

At the 6 tip of the end portion 4 of the conveyor belt 1, the elongated objects fall from the conveyor belt 1 into a vibrating product-orientation hopper 7.

Using the inclined conveyor belt 1 to establish an even rate of discharge for the elongated objects tends to allow such elongated objects to bounce in the product-orientation hopper 7 and to settle into a position of lowest energy, as dictated by the laws of entropy, before additional elongated objects fall and preclude the elongated object which dropped earlier from achieving its lowest potential energy. This tends to cause each elongated object to be oriented in a horizorital plane. Furthermore, by having the width 8 of the product-orientation hopper 7 narrower than the length of most of the elongated objects, the longitudinal axis of the elongated objects will tend, also, to be parallel to the sides 9 of the product-orientation hopper 7.

The preceding elements of the Device for Orienting and Achieving the Optimal Density of a Quantity of Elongated Objects constitute the preferred mechanical components for implementing the preferred method of orienting the elongated objects within a charge of elongated objects so that such elongated objects are substantially parallel to one another and so that each elongated object lies substantially within a horizontal plane. The mechanical components described below, which achieve the optimal density for the elongated objects by exerting opposing horizontal forces on the charge of substantially parallel and substantially horizontal elongated objects would, however, function effectively with any device and technique which orients the elongated objects so that such elongated objects are substantially parallel to one another and so that each elongated object lies substantially within a horizontal plane.

Figure 2:
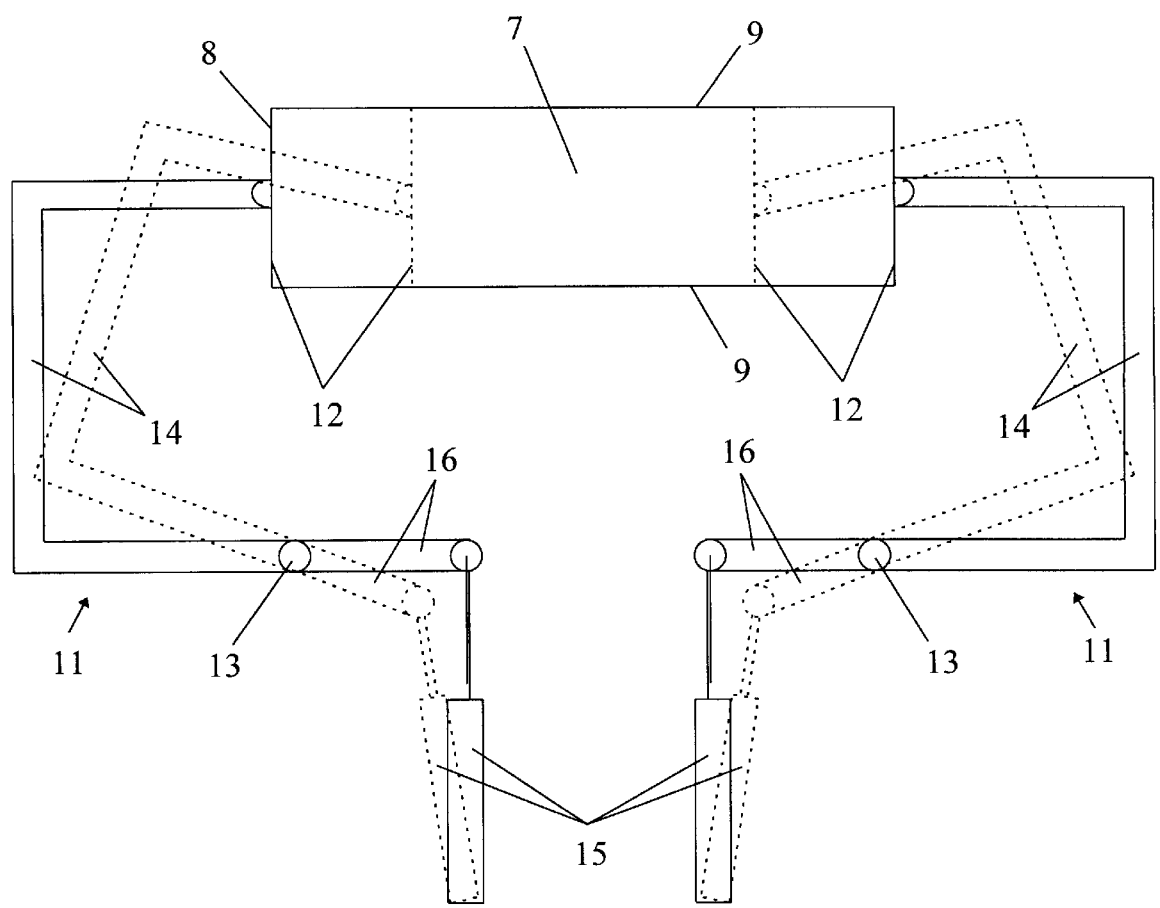
FIG. 2 is a plan view of the hopper and horizontal squeezer which form portions of the Device for Orienting and Achieving the Optimal Density of a Quantity of Elongated Objects.
Figure 3:
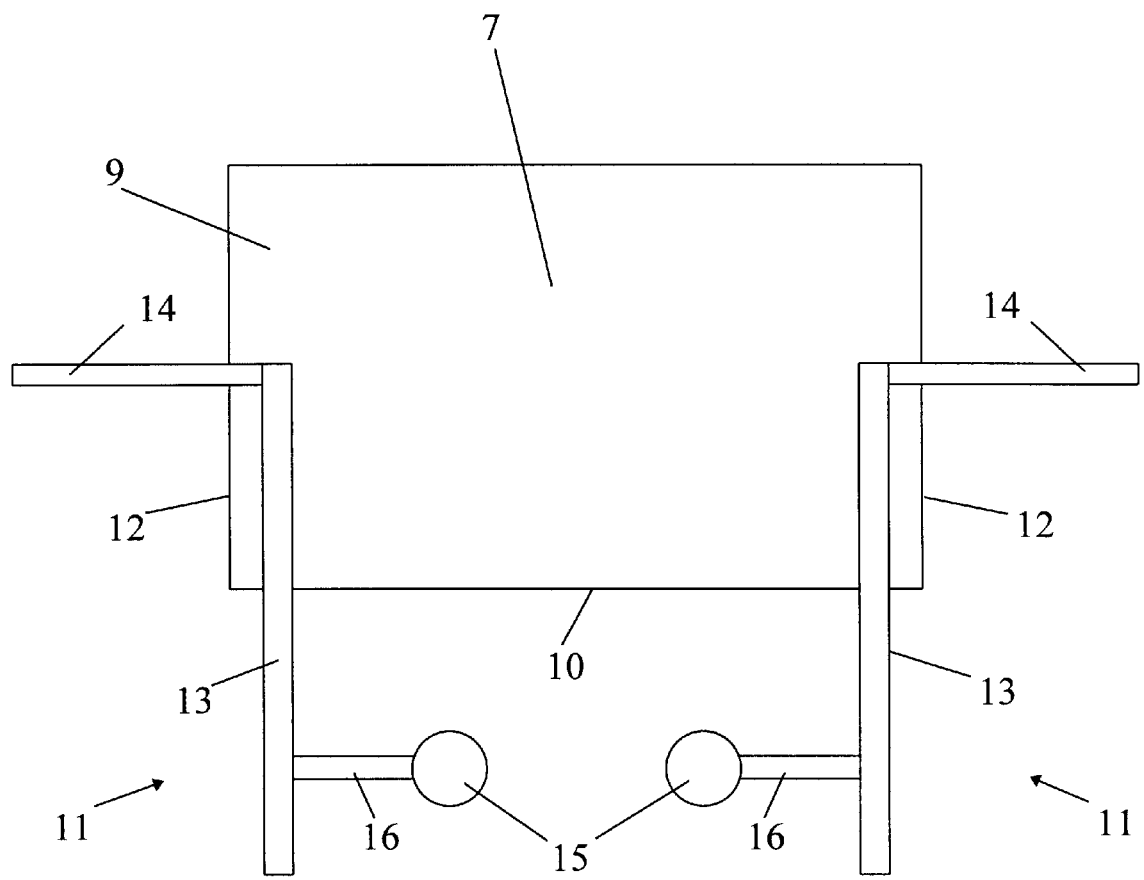
FIG. 3 is an elevation view of the hopper and horizontal squeezer which form portions of the Device for Orienting and Achieving the Optimal Density of a Quantity of Elongated Objects.
Figure 4:
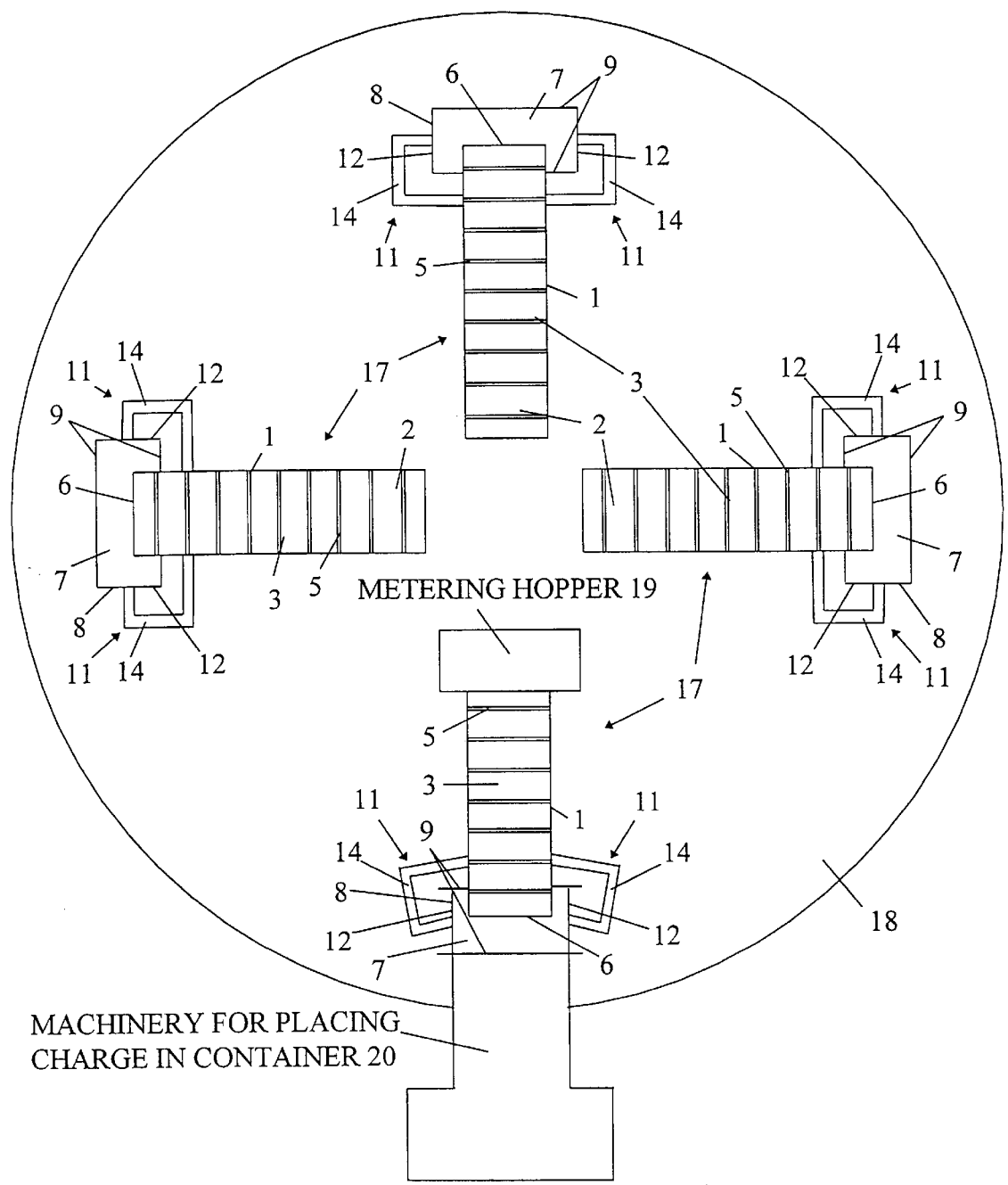
FIG. 4 is a plan view of a turntable upon which several Devices for Orienting and Achieving the Optimal Density of a Quantity of Elongated Objects have been located.

The product-orientation hopper 7 is vibrated by techniques that are well known in the art; and this vibration tends to cause smaller elongated object to tend to move toward the bottom 10 of the product-orientation hopper 7, which, in turn, creates a greater density of elongated objects. Unfortunately, however, both because the elongated objects are not perfectly straight and because the elongated objects are not perfectly parallel to one another, voids still exist between the elongated objects. Therefore, horizontal squeezers 11 are activated—preferably, as illustrated in FIG. 2, FIG. 3, and FIG. 4, at each end 12 of the product-orientation hopper 7, although it would be satisfactory to have a horizontal squeezer 11 at only one end 12 of the product-orientation hopper 7—to push the elongated objects from at least one, but preferably both, ends 12 of the product-orientation hopper 7 and, consequently, to optimize the density of the elongated objects within the product-orientation hopper 7 by forcing the ends of the elongated objects into such voids in much the same manner as a wedge functions.

When a horizontal squeezer 11 is placed at each end 12 of the product-orientation hopper, each end 12 of the product-orientation hopper 7 is slidably mounted between the sides 9 of the product-orientation hopper 7 and above the bottom 10 of the product-orientation hopper 7. The tolerances between each end 12 and the sides 9 as well as between each end 12 and the bottom 10 of the product-orientation hopper 7 are such that none of the elongated objects can pass between an end 12 and either side 9 or an end 12 and the bottom 10 of the product-orientation hopper 7. When a horizontal squeezer 11 is placed at only one end 12 of the product-orientation hopper 7, it is then preferably to have only that one end 12 of the product-orientation hopper 7 slidably mounted.

The horizontal squeezers 11 consist of any mechanism which can push the ends 12 of the product-orientation hopper 7 toward one another. Preferably, for each end 12, a rotatable shaft 13 is attached to, and imparts rotational motion to an arm 14 that is, in turn, pivotally connected to the end 12 of the product-orientation hopper 7. When the shaft 13 is rotated in one direction, the arm 14 pushes the end 12 of the product-orientation hopper 7 that is attached to the arm 14 toward the other end 12 of the product-orientation hopper 7; when the shaft 13 is rotated in the other direction, the arm 14 pulls the end 12 of the product-orientation hopper 7 that is attached to the arm 14 away from the other end 12 of the product-orientation hopper 7. The shaft 13 could be rotated by a motor (not illustrated) or, preferably and as illustrated in FIG. 2 and FIG. 3, by an air cylinder 15 for pushing and pulling against an outward extension 16 from the shaft 13. In another alternate example, an air cylinder (not illustrated) could be located at, and directly attached to, each end 12 of the product-orientation hopper 7 directly to push and pull such end 12.

After the horizontal squeezing has been completed, the bottom 10 of the product-orientation hopper 7 opens to permit the optimally concentrated charge of elongated objects to travel to its ultimate container.

Preferably, as portrayed in FIG. 4, several Devices for Orienting and Achieving the Optimal Density of a Quantity of Elongated Objects 17 are arranged on a turntable 18. (Although four Devices 17 are pictured on the turntable 18, there could be either a greater or a lesser number of Devices 17 on the turntable 18.) A metering hopper 19 is located just outside the center of the turntable 18, but is not attached to the turntable 18, to place the pre-weighed product charge on the first portion 2 of the cleated conveyor belt 1 for a given Device for Orienting and Achieving the Optimal Density of a Quantity of Elongated Objects 17 as such Device 17 is rotated under the metering hopper 19. When the process for aligning and achieving the optimal density is operating, the timing is preferably selected such that a given Device 17 will complete its process at the same time as that Device 17 is receiving the pre-weighed product charge. Therefore, any machinery 20 that is well known in the art for placing the optimally concentrated charge of elongated objects into a container is located on the outside of the turntable 18, and partially overlaps but is not attached to the turntable 18, at the same angular position with respect to the turntable 18 as is the metering hopper 19 so that the optimally concentrated charge of elongated objects is discharged from the product-orientation hopper 7 at approximately the same time as the pre-weighed product charge is placed on the conveyor belt 1. (Of course, it would be possible to have the product-orientation hoppers 7 extend beyond the edge of the turntable 18, rather than having the machinery 20 overlap the turntable.)

I claim:

1. A device for orienting and achieving the optimal density of a quantity of elongated objects, which comprises:
   a means for orienting the elongated objects so that such elongated objects are substantially parallel to one another and so that each elongated object lies substantially within a horizontal plane; and
   a means for achieving the optimal density for the elongated objects by exerting opposing horizontal forces on the quantity of substantially parallel and substantially horizontal elongated objects.

2. A device for orienting and achieving the optimal density of a quantity of elongated objects, which comprises:
   a conveyor having an inclined cleated conveyor belt to establish an even rate of discharge from the end of said conveyor belt for elongated objects placed upon the first portion of the conveyor belt;
   a product-orientation hopper to receive the elongated objects which fall from the end of said inclined cleated conveyor belt; and
   a means for achieving the optimal density for the elongated objects by exerting opposing horizontal forces on the quantity of substantially horizontal elongated objects which collect in the product-orientation hopper.

3. The device for orienting and achieving the optimal density of a quantity of elongated objects as recited in claim 2, wherein:
   the width of the product-orientation hopper is selected to be narrower than the length of most of the elongated objects so that the elongated objects are substantially parallel to one another and to the sides of the product-orientation hopper.

4. The device for orienting and achieving the optimal density of a quantity of elongated objects as recited in claim 3, further comprising:
   a means for vibrating the product-orientation hopper.

5. A device for orienting and achieving the optimal density of a quantity of elongated objects, which comprises:
   a conveyor having an inclined cleated conveyor belt to establish an even rate of discharge from the end of said cleated conveyor belt for elongated objects placed upon the first portion of said cleated conveyor belt;
   a product-orientation hopper to receive the elongated objects which fall from the end of said conveyor, at least one end of which product-orientation hopper is slidably mounted between the sides of said product-orientation hopper and above the bottom of said product-orientation hopper; and
   a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper.

6. A device for orienting and achieving the optimal density of a quantity of elongated objects which comprises:
   a conveyor having an inclined cleated conveyor belt to establish an even rate of discharge from the end of said cleated conveyor belt for elongated objects placed upon the first portion of said cleated conveyor belt;
   a product-orientation hopper to receive the elongated objects which fall from the end of said conveyor, at least one end of which product-orientation hopper is slidably mounted between the sides of said product-orientation hopper and above the bottom of said product-orientation hopper; and
   a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper, wherein said horizontal squeezer comprises
     an arm pivotally connected to a slidably mounted end of the product-orientation hopper;
     a rotatable shaft attached to said arm so that said arm pushes the end of the product-orientation hopper to which said arm is attached toward the other end of the product-orientation hopper when said rotatable shaft is rotated in one direction and said arm pulls the end of the product-orientation hopper to which said arm is attached away from the other end of the product-orientation hopper when the shaft is rotated in the other direction; and
     a means for rotating the rotatable shaft.

7. The device for orienting and achieving the optimal density of a quantity of elongated objects as recited in claim 6, wherein the means for rotating the rotatable shaft comprises:
   a motor attached to said rotatable shaft.

8. The device for orienting and achieving the optimal density of a quantity of elongated objects as recited in claim 6, wherein the means for rotating the rotatable shaft comprises:
   an outward extension connected to said rotatable shaft; and
   an air cylinder attached to said outward extension for pushing and pulling against said outward extension.

9. A device for orienting and achieving the optimal density of a quantity of elongated objects which comprises:
   a conveyor having an inclined cleated conveyor belt to establish an even rate of discharge from the end of said cleated conveyor belt for elongated objects placed upon the first portion of said cleated conveyor belt;
   a product-orientation hopper to receive the elongated objects which fall from the end of said conveyor, at least one end of which product-orientation hopper is slidably mounted between the sides of said product-orientation hopper and above the bottom of said product-orientation hopper; and
   a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper, wherein said horizontal squeezer comprises
     an air cylinder attached to a slidably mounted end of the product-orientation hopper to push said slidably mounted end toward the other end of the product-orientation hopper and to pull such slidably mounted end away from the other end of the product-orientation hopper.

10. The device for orienting and achieving the optimal density of a quantity of elongated objects as recited in claim 5, wherein:

the first portion of said cleated conveyor belt is substantially horizonal;

said cleated conveyor belt is vertically inclined throughout its middle portion; and the end portion of the cleated conveyor belt is substantially horizontal.

11. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper; and a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper, wherein the first portion of said cleated conveyor belt is substantially horizontal;

said cleated conveyor belt is vertically inclined throughout its middle portion;

the end portion of the cleated conveyor belt is substantially horizontal; and said horizontal squeezer comprises an arm pivotally connected to a slidably mounted end of the product-orientation hopper;

a rotatable shaft attached to said arm so that said arm pushes the end of the product-orientation hopper to which said arm is attached toward the other end of the product-orientation hopper when said rotatable shaft is rotated in one direction and said arm pulls the end of the product-orientation hopper to which said arm is attached away from the other end of the product-orientation hopper when the shaft is rotated in the other direction; and a means for rotating the rotatable shaft.

12. The device for orienting and achieving the optimal density of a quantity of elongated objects as recited in claim 11, wherein the means for rotating the rotatable shaft comprises:

a motor attached to said rotatable shaft.

13. The device for orienting and achieving the optimal density of a quantity of elongated objects as recited in claim 11, wherein the means for rotating the rotatable shaft comprises:

an outward extension connected to said rotatable shaft; and an air cylinder attached to said outward extension for pushing and pulling against said outward extension.

14. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper; and a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper, wherein the first portion of said cleated conveyor belt is substantially horizontal;

said cleated conveyor belt is vertically inclined throughout its middle portion;

the end portion of the cleated conveyor belt is substantially horizontal; and said horizontal squeezer comprises an air cylinder attached to a slidably mounted end of the product-orientation hopper to push said slidably mounted end toward the other end of the product-orientation hopper and to pull such slidably mounted end away from the other end of the product-orientation hopper.

15. The device for orienting and achieving the optimal density of a quantity of elongated objects as recited in claim 5, further comprising:

a means for vibrating the product-orientation hopper; and wherein the width of the product-orientation hopper is selected to be narrower than the length of most of the elongated objects so that the elongated objects are substantially parallel to one another and to the sides of the product-orientation hopper.

16. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper;

a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper;

a means for vibrating the product-orientation hopper; wherein the width of the product-orientation hopper is selected to be narrower than the length of most of the elongated objects so that the elongated objects are substantially parallel to one another and to the sides of the product-orientation hopper; and wherein said horizontal squeezer comprises an arm pivotally connected to a sidably mounted end of the product-orientation hopper;

a rotatable shaft attached to said arm so that said arm pushes the end of the product-orientation hopper to which said arm is attached toward the other end of the product-orientation hopper when said rotatable shaft is rotated in one direction and said arm pulls the end of the product-orientation hopper to which said arm is attached away from the other end of the product-orientation hopper when the shaft is rotated in the other direction; and a means for rotating the rotatable shaft.

17. The device for orienting and achieving the optimal density of a quantity of elongated objects as recited in claim 16, wherein the means for rotating the rotatable shaft comprises:

a motor attached to said rotatable shaft.

18. The device for orienting and achieving the optimal density of a quantity of elongated objects as recited in claim 16, wherein the means for rotating the rotatable shaft comprises:

an outward extension connected to said rotatable shaft; and an air cylinder attached to said outward extension for pushing and pulling against said outward extension.

19. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper;

a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper;

a means for vibrating the product-orientation hopper; wherein the width of the product-orientation hopper is selected to be narrower than the length of most of the elongated objects so that the elongated objects are substantially parallel to one another and to the sides of the product-orientation hopper; and wherein said horizontal squeezer comprises an air cylinder attached to a slidably mounted end of the product-orientation hopper to push said slidably mounted end toward the other end of the product-orientation hopper and to pull such slidably mounted end away from the other end of the product-orientation hopper.

20. The device for orienting and achieving the optimal density of a quantity of elongated objects as recited in claim 10, further comprising:

a means for vibrating the product-orientation hopper; and wherein the width of the product-orientation hopper is selected to be narrower than the length of most of the elongated objects so that the elongated objects are substantially parallel to one another and to the sides of the product-orientation hopper.

21. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper; and a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper; and a means for vibrating the product-orientation hopper, wherein the width of the product-orientation hopper is selected to be narrower than the length of most of the elongated objects so that the elongated objects are substantially parallel to one another and to the sides of the product-orientation hopper, the first portion of said cleated conveyor belt is substantially horizontal, said cleated conveyor belt is vertically inclined throughout its middle portion, the end portion of the cleated conveyor belt is substantially horizontal, and said horizontal squeezer comprises an arm pivotally connected to a slidably mounted end of the product-orientation hopper;

a rotatable shaft attached to said arm so that said arm pushes the end of the product-orientation hopper to which said arm is attached toward the other end of the product-orientation hopper when said rotatable shaft is rotated in one direction and said arm pulls the end of the product-orientation hopper to which said arm is attached away from the other end of the product-orientation hopper when the shaft is rotated in the other direction; and a means for rotating the rotatable shaft.

22. The device for orienting and achieving the optimal density of a quantity of elongated objects as recited in claim 21, wherein the means for rotating the rotatable shaft comprises:

a motor attached to said rotatable shaft.

23. The device for orienting and achieving the optimal density of a quantity of elongated objects as recited in claim 21, wherein the means for rotating the rotatable shaft comprises:

an outward extension connected to said rotatable shaft; and an air cylinder attached to said outward extension for pushing and pulling against said outward extension.

24. A device for orienting and achieving the optimal density of a quantity of elongated objects which comprises:

a conveyor having an inclined cleated conveyor belt to establish an even rate of discharge from the end of said cleated conveyor belt for elongated objects placed upon the first portion of said cleated conveyor belt;

a product-orientation hopper to receive the elongated objects which fall from the end of said conveyor, at least one end of which product-orientation hopper is slidably mounted between the sides of said product-orientation hopper and above the bottom of said product-orientation hopper; and a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper; and a means for vibrating the product-orientation hopper, wherein the width of the product-orientation hopper is selected to be narrower than the length of most of the elongated objects so that the elongated objects are substantially parallel to one another and to the sides of the product-orientation hopper, the first portion of said cleated conveyor belt is substantially horizontal, said cleated conveyor belt is vertically inclined throughout its middle portion, the end portion of the cleated conveyor belt is substantially horizontal, and said horizontal squeezer comprises an air cylinder attached to a slidably mounted end of the product-orientation hopper to push said slidably mounted end toward the other end of the product-orientation hopper and to pull such slidably mounted end away from the other end of the product-orientation hopper.

25. A process for orienting and achieving the optimal density of a quantity of elongated objects, which comprises:

orienting the elongated objects so that such elongated objects are substantially parallel to one another and so that each elongated object lies substantially within a horizontal plane; and achieving the optimal density for the elongated objects by exerting opposing horizontal forces on the quantity of substantially parallel and substantially horizontal elongated objects.

26. A process for orienting and achieving the optimal density of a quantity of elongated objects, which comprises:

using a conveyor having an inclined cleated conveyor belt so that the rate of discharge of elongated objects from the end of the conveyor belt will be even for elongated objects which have been placed upon the first portion of the conveyor belt;

receiving in a product-orientation hopper the elongated objects which fall from the end of the inclined cleated conveyor belt; and achieving the optimal density for the elongated objects by exerting opposing horizontal forces on the quantity of substantially parallel and substantially horizontal elongated objects which collect in the product-orientation hopper.

27. A process for orienting and achieving the optimal density of a quantity of elongated objects, which comprises:

using a conveyor having an inclined cleated conveyor belt so that the rate of discharge of elongated objects from the end of the conveyor belt will be even for elongated objects which have been placed upon the first portion of the conveyor belt;

receiving the elongated objects which fall from the end of the inclined cleated conveyor belt in a product-orientation hopper, the width of the product-orientation hopper is selected to be narrower than the length of most of the elongated objects so that the elongated objects are substantially parallel to one another and to the sides of the product orientation hopper and at least one end of which product-orientation hopper is slidably mounted between the sides of said product-orientation hopper and above the bottom of said product-orientation hopper;

vibrating the product-orientation hopper; and using a horizontal squeezer placed at at least one end of said product-orientation hopper to push the end of the product-orientation hopper at which said horizontal squeezer has been placed toward the other end of said product-orientation hopper to push the elongated objects from at least one end of said product-orientation hopper.

* * * * *